Patented July 6, 1943

2,323,861

UNITED STATES PATENT OFFICE 2,323,861

SYNTHESIS OF ORGANIC ACIDS

Carl N. Zellner, Elizabeth, N. J., assignor to Tide Water Associated Oil Company, New York, N. Y., a corporation of Delaware No Drawing. Application November 21, 1942, Serial No. 466,502

7 Claims. (Cl. 260—533)

This invention relates to the preparation or organic acids. More particularly, it releates to methods for the production of dibasic acids, either in the pure state or in association with other organic acids, especially monobasic acids, in useful compositions. Particular dibasic acids produced according to this invention are represented by the formula

COOH(R)COOH wherein R is a hydrocarbon chain of 3 or 4 carbon atoms, one or more of which may have an alkyl radical or radicals such as methyl, ethyl, propyl, etc., substituted for hydrogen. An example of this class is adipic acid which has the following formula:

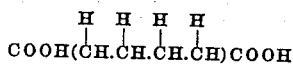

Another specific example is glutaric acid which has the following formula:

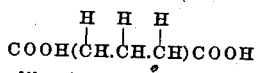

Heretofore dibasic acids have been prepared in various ways of which the procedures utilizing the oxidation of cyclohexanol or cyclohexene with potassium permanganate, potassium dichromate or blowing with air to form adipic acid are possibly the better known.

One object of this invention is to produce dibasic acids, such as adipic and glutaric acids, more economically than by such methods of the prior art as the foregoing. Potassium permanganate and potassium dichromate are relatively expensive, whereas the practice of the present invention entails the use of less expensive reagents.

It is also an object of the invention to produce dibasic acids in a comparatively simple process which does not involve separation of the product from metallic salts.

In the process of the present invention nitric oxide and nitro compounds are formed, and a further object is in the profitable utilization of these by-products, particularly in use of the nitric oxide, for production of nitric acid which may be recycled to the process.

Still another object is to provide a method of manufacturing dibasic acids in which the yield of the desired product is relatively high. The yield obtained by my procedure may run as high as 90% by weight based on the quantity of cyclic olefin used in the operation.

With these objects, and other objects of my invention which will appear from the following description, in view, the invention in its general aspect contemplates a method of reacting cyclic olefins with nitric acid of particular strength to form dibasic acids. As will be apparent from the following description, the invention includes as specific features the use, as materials to be treated with nitric acid, of individual cyclic olefins, mixtures thereof, or an olefinic mixture containing both cyclic or acyclic olefines such, for example, as may be derived by suitable treatment of petroleum fractions. The dibasic acid reaction products resulting from the nitric acid oxidation reaction may consist of dibasic acids or mixtures of dibasic and monobasic acids depending upon the materials treated.

The reaction proceeds quite rapidly in the presence of catalysts and it is preferred that catalysts should be used. In the absence of catalysts the reaction starts slowly and the yield of dibasic acids is reduced, and in view of these disadvantages the desirability of using a catalyst will be quite apparent.

In the preparation of dibasic acids under the procedure described as my invention, the oxidation with nitric acid was carried on at various temperatures ranging from 50° C. to 90° C. In one example the temperature was kept between 60° and 70° C. and the oxidation proceeded quite smoothly and the yield of dibasic acids was relatively high.

Various catalysts have been found satisfactory in connection with the nitric acid oxidation reaction of this invention. Pulverized metals, metallic compounds such as the sodium, potassium, barium and ammonium salts of acids, and metallic oxides have given excellent results in my operations. Powdered vanadium, nickel or cobalt are illustrative of metallic catalysts. The sodium, potassium, barium and ammonium salts of vanadic, tantalic, titanic, manganic, chromic and molybdic acids, and the following oxides, $V_2O_5$, $Ta_2O_5$, $TiO_2$, $ThO_2$, $PbO_2$, $MnO_2$, $CeO_2$, $CoO_2$, $Cr_2O_3$ and $MoO_3$, are illustrative of other catalysts that may be used in the nitric acid oxidation step to convert the cyclic olefins to organic acids. The above list of catalysts is not to be construed as exhaustive since any catalyst which tends to propagate the oxidation reaction in my operations is included within the scope of the invention.

The starting material may contain cyclic olefins having five or six membered ring structures. The unsaturated double bond may be at any position in the ring without affecting the dibasic acids formed or the yield. Examples of such compounds are cyclohexene, methyl cyclohexene, cyclo-pentene and methyl cyclo-pentene. From these four illustrative source materials may be prepared adipic, methyl adipic, glutaric and methyl glutaric acid respectively.

In my development work I have found use of nitric acid as the oxidation medium for the cyclic olefins results in high yields of dibasic acids without accompanying formation of by-products which would be difficult to separate from the dibasic acid crystals. An important feature of the invention resides in the use of nitric acid of a concentration below that of fuming nitric acid. Nitric acids having an initial concentration (i. e., at the start of the reaction) of from about 30% to about 75% give excellent yields and smooth operation. Of course in batch operation the nitric acid concentration becomes lowered as the reaction progresses and the acid is consumed. Thus, the final acid concentration may be below the stated range. The use of fuming nitric acid results in unsatisfactory yield of dibasic acids and must be avoided. It is believed that the violent or extreme action of fuming nitric acids on cyclic olefins tends to break the cyclic compounds into short membered straight chain compounds, thereby reducing the amount of dibasic acids formed.

The by-products which are formed in my process are nitric oxide gas and nitro-compounds. The nitric oxide gas is recovered and mixed with air, thereby forming nitrogen tetra-oxide gas and the resulting nitrogen tetra-oxide gas is then bubbled through water with air to regenerate nitric acid. The nitric acid obtained through this recovery procedure may then be recycled through the process to react with additional cyclic olefins to form additional dibasic acids.

As an example of one way in which the invention may be carried out in practice in instances where individual or mixtures of individual cyclic olefins are employed as starting materials, 164 grams of cyclohexene were oxidized with 50% nitric acid (600 grams of 70% nitric acid and 240 grams of water) in the presence of 0.5 gram of ammonium vanadate. The cyclohexene was added gradually, accompanied by vigorous stirring, to the reaction mixture and the mixture was maintained at a temperature of 60°–70° C. (140°–158° F.). Due to the heat given off in the reaction, occasional cooling of the container with water was necessary. The addition of the cyclohexene to the acid required about three hours. After stirring for about one hour longer in order to complete reaction between the acid and he cyclohexene, the reaction mixture was allowed to cool. Adipic acid crystallized from the solution and was separated by filtration. The yield was 83 grams having a melting point of 152°–153° C. (306°–307° F.).

The other liquor was then evaporated, washed with ether and 21 additional grams of adipic acid, melting point 151°–152° C. (304°–306° F.), were obtained. The ether washings removed any occluded oily by-products consisting primarily of nitro compounds.

The preceding example was repeated and the cyclohexene was added more slowly. The addition time was extended to five hours and the temperature was kept at 55°–65° C. (131°–149° F.). In this case the physical yield of adipic acid having a melting point of 150°–152° C. (302°–306° F.) was over 90%.

It will be evident from the above that the yield of dibasic acid produced in accordance with the method of this invention is to some degree influenced by the conditions of operation. Thus, when the operation is conducted over a somewhat longer period of time and at a slightly lower temperature, increased yields of the finished product are obtained.

The following example will illustrate the production of methyl glutaric acid from methyl cyclo-pentene in substantially the same procedure followed in preparing adipic acid from cyclohexene. In this run, 23 grams of methyl cyclopentene were added gradually to a solution of 84 grams of nitric acid (70% $HNO_3$) and 34 grams of water, containing 0.3 gram ammonium vanadate. The mixture was constantly stirred during the addition which required 4 hours and the temperature was kept between 60°–70° C. Following the slow addition, the reacted mixture was evaporated to dryness yielding impure crystals of methyl glutaric acid.

The impure, crude yellowish crystals of methyl glutaric acid were dissolved in water and the solution neutralized with sodium bicarbonate. The solution was then washed with ether which removed 2 or 3 grams of nitro compounds. Following the ether washing, the solution was neutralized with dilute hydrochloric acid, filtered from charcoal and evaporated to dryness. Crude methyl glutaric acid crystals were then obtained upon ether and alcohol extraction of the salt residue.

Ammonia gas was passed through the cooled ether-alcohol solution, whereupon diammonium salts of methyl glutaric acid were precipitated. These were filtered off, washed with ether and alcohol, and were then dissolved in water. The aqueous solution was neutralized with hydrochloric acid and evaporated to dryness. The methyl glutaric acid product was extracted with ether and was found to weigh 17 grams and consisted almost wholly of pure methyl glutaric acid as was indicated by the boiling point and by titration.

The total physical yield in the present example was about 80% and the product had a melting point of 77° C.–78° C. As in the case of adipic acid, different mixing rates and different temperatures occasion different yields of methyl glutaric acid.

As indicated above, another phase or embodiment of the invention resides in the application of the described nitric acid oxidation treatment to olefinic starting materials which may contain acyclic olefins as well as cyclic olefins. Such materials may be obtained from petroleum fractions by methods to be described. The stated nitric acid treatment of these materials results in organic acid mixtures comprising wholly or predominately dibasic acids or mixtures of dibasic and monobasic organic acids. These mixed acids have general utility in synthetic resin manufacturing, in plasticizers, as chemical intermediates in the production of various compounds such as esters, etc., and for other application in arts using organic acids or mixtures thereof.

This phase of the invention accordingly comprises oxidizing a mixture containing acyclic and cylic olefins with nitric acid in a manner similar to that described hereinabove, to obtain a product containing a mixture of organic acids including both monobasic and dibasic acids. The starting materials for this reaction may be obtained from suitable petroleum fractions by chlorinating said fractions and dehydrochlorinating the resulting product.

Inasmuch as high yields of dibasic acids are desirable, petroleum fractions having a naturally high naphthenic content are preferred. A high naphthenic content indicates a substantial amount of cyclopentane, methyl cyclopentane, cyclohexane, methyl cyclohexane, etc., which are the desirable components necessary in my process for forming dibasic acids. If the petroleum fraction contains aromatic constituents, these should be hydrogenated to naphthenic compounds.

An illustrative petroleum fraction useful for the practice of the invention in an embodiment thereof directed to preparing a mixture of dibasic acids in high yield is the following.

A fraction or cut within the temperature range of 65°–85° C. was taken from a flash-tower gasoline derived mainly from a specific crude oil. The Egloff analysis of the cut showed a composition as follows:

Unsaturates _____ Very slight trace
Aromatics _____ None
Naphthenes _____ per cent __ 48
Paraffins _____ do ____ 52

A fraction of this analysis, upon treatment to form olefins and subsequent treatment with nitric acid, will yield a mixture of organic acids composed of approximately 50% dibasic acids and 50% monobasic acids.

As a second specific illustration of useful petroleum source material may be mentioned a reformed naphtha having the following Egloff analysis:

|  | Per cent |
| --- | --- |
| Unsaturates | 18.4 |
| Aromatics | 25.0 |
| Naphthenes | 24.0 |
| Paraffins | 32.6 |

A fraction of this reformed naphtha boiling from 65° C.–100° C. was segregated for use as source material in the practice of the invention. Inasmuch as dibasic acids were the main objective, the 65° C.–100° C. cut was shaken with 80% sulfuric acid to remove acyclic olefins. The reduced cut then was hydrogenated to convert the aromatic content to naphthenes. As thus treated, the eventual analysis of the material intended for use in the invention comprised about 70% naphthenes and 30% paraffins; and upon subsequent conversion to cyclic and acyclic olefins followed by treatment with nitric acid, a mixture of dibasic and monobasic acids results, the former constituting about 70% of the organic acid mixture.

Other cuts from various fractions, taken from different crude oils, showed analyses in which the naphthenic content was as high as 70%, the paraffinic, aromatic and unsaturated contents being relatively low. A fraction having a high naphthenic content is the most desirable of the various fractions discussed since very little treatment of the fraction is necessary to prepare the cut prior to treatment with nitric acid. Such a fraction will give a mixture of organic acids having a very high percentage of the desirable dibasic acids.

In order to prepare the cuts for subsequent treatment with nitric acid, it is necessary to convert the naphthenic and paraffinic compounds respectively to cyclic and acyclic olefins. This conversion is accomplished by halogenation of the cut followed by dehydrohalogenation to yield the olefin corresponding to the original hydrocarbon. In the discussion and the examples given below, I will refer to chlorination of the naphthenic and paraffinic compounds, followed by dehydrochlorination to form the respective olefins, since chlorine gives excellent results and furthermore it is quite economical in this particular operation. Other halogens can readily be used in place of chlorine and give equally good results, and it is to be understood that even though chlorine is used in the discussion and the specific embodiments of my examples, other halogens are included within the scope of my invention in connection with the particular step under consideration.

The chlorination of the various cuts may be accomplished by any of the methods known to those skilled in the art. The following specific examples using the photochemical method gave results as follows:

A 168 gram sample of a flash tower gasoline cut having a boiling range of 65°–85° C. (as referred to hereinbefore), was chlorinated slowly in diffused daylight for a period of 7 hours at room temperature. The hydrocarbon cut, after the above treatment, yielded 108 grams of recovered hydrocarbon, 59 grams monochlor-derivatives having a boiling point of 140°–150° C. and 43 grams of dichlor derivatives having a boiling point of 70° to 90° C. at 2 mm. of mercury. A 200 gram sample of the same cut, after 14 hours stirring at room temperature and chlorinated under similar conditions, yielded 77 grams of recovered hydrocarbon, 102 grams monochlor-componds and 37 grams dichlor-compounds. A 400 gram sample of the same cut, after 20 hours without stirring and chlorinated under similar conditions, yielded 199 grams of recovered hydrocarbon (gasoline), 213 grams monochlor-compounds and 58 grams dichlor-compounds.

It has been indicated that both monochlor- and dichlor-derivatives are formed during the chlorination procedure. These compounds upon dehydrochlorination and subsequent treatment with nitric acid form monobasic and dibasic acids, and since the dibasic acids are the main objective, it is preferable that the dichlor-derivatives, which primarily form monobasic acids, be removed from the chlorinated mixture. The separation, if made, is accomplished through distillation.

The chlorinated hydrocarbons, irrespective of the method used in chlorinating, were now subjected to dehydrochlorination which yielded the olefin corresponding to the original hydrocarbon. Dehydrochlorination creates the unsaturated structure in both the cyclic and acyclic paraffin compounds. Several methods of dehydrochlorination are known and it is immaterial which procedure is followed as the dehydrochlorination step in the operation of my invention.

In my operations, I used two different methods of dehydrochlorination, viz: (1) distillation from quinoline, and (2) a catalytic high temperature method. Both of these methods of dehydrochlorination gave good results and satisfactory yields of olefinic compounds.

In the quinoline dehydrochlorination method, one part of the chlorinated hydrocarbon and two parts of quinoline were heated in a flask connected to a Widmer column. The temperature was regulated so that the dehydrochlorinated hydrocarbons or olefins were distilled off through the column as they were formed, and after 8 hours about 90% yield of olefins was obtained.

The mixture of quinoline and the hydrochloride remaining in the flask was treated with hot sodium hydroxide solution. The quinoline layer was separated and distilled, under reduced pressure, and the quinoline thus recovered for subsequent use.

The quinoline method for dehydrochlorinating is a very convenient one, and is especially suitable for laboratory or small scale production operations.

The treated hydrocarbons, now in the form of olefins, are next subjected to a nitric acid treatment which converts the olefins to the corresponding organic acid. If the treated hydrocarbon has a high content of cyclohexene, the final product will have a high content of adipic acid. Inasmuch as the yielded olefins are a mixture of both cyclic and acyclic olefins, the final product will be a mixture of monobasic and dibasic acids. It has been indicated above that it will be more desirable if the dibasic acid yield is very high, and with this purpose in view effort should be made to choose petroleum fractions that have a relatively high naphthenic content.

The unsaturated fraction produced by chlorination and dehydrochlorination was oxidized with 50% nitric acid at 55°–60° C. in the presence of a small amount of a catalyst such as ammonium vanadate. The reaction proceeds with or without a catalyst but it is preferable to use a catalyst since the reaction is started more readily in its presence. If a catalyst is used, it is necessary to use only a relatively small quantity, usually not exceeding 1% based on the weight of the olefin mixture. The temperature was maintained at 55°–60° C. for a period of five hours, which was the time required for the addition of the olefins to the acid. The reaction was allowed to continue further for one hour, and upon completion of the oxidation, it was found that a mixture of organic acids, viz: dibasic and monobasic acids, and a small quantity of nitro compounds composed the final product.

In general the conditions as to nitric acid concentration range and temperature range, and catalysts employed in this embodiment, are substantially the same as those described hereinabove in oxidizing pure or individual cyclic olefins.

The mixture of organic acids resulting from the nitric acid oxidation of the olefinic mixture is composed primarily of dibasic acids such as glutaric, methyl glutaric, adipic, methyl adipic, etc., monobasic acids such as butyric, valeric, methyl valeric, caproic, heptylic, etc., and some nitro compounds. If it is desired to separate the organic acid mixture into the dibasic and monobasic acid groups, this can be accomplished without much difficulty. As an example of a method for separating the monobasic from the dibasic acids, the following procedure will be found to be satisfactory: The organic acid mixture containing the monobasic acids, dibasic acids and some nitro compounds is allowed to cool and the crystallized dibasic acids are separated from the mother liquor. The aqueous solution is extracted with ether and then evaporated to obtain additional dibasic acid yield. The ether extract contains monobasic acids and nitro compounds; and is now treated with sodium bicarbonate to form the sodium salts of the monobasic acids, which are readily separated from the ether solution containing nitro compounds.

This application constitutes a continuation-in-part of my copending application, Serial No. 257,700.

I claim:

1. Process for oxidizing hydrocarbons or mixtures thereof, said hydrocarbons selected from the group consisting of cyclohexene, methyl cyclopentene, and homologues thereof, to produce dibasic acids which comprises slowly adding said hydrocarbons to nitric acid of a concentration from about 30% to about 75% while maintaining the temperature of the reaction mixture at not above about 90° C. and recovering dibasic acid so formed.

2. Process for oxidizing hydrocarbons selected from the group consisting of cyclohexene, methyl cyclopentene, and homologues thereof, to produce dibasic acids which comprises slowly adding said hydrocarbons to nitric acid of a concentration from about 30% to about 75% while maintaining the temperature of the reaction mixture at not above about 70° C. and recovering the dibasic acid so formed.

3. Process for oxidizing cyclohexene to produce adipic acid which comprises slowly adding cyclohexene to nitric acid of a concentration from about 30% to about 75% in the presence of an oxidation catalyst while maintaining the temperature of the reaction mixture at not above about 70° C. and recovering the adipic acid so formed.

4. In a method for producing mixtures of organic acids containing dibasic acids from olefinic mixtures containing cyclic olefins and derived from petroleum fractions, the step comprising slowly adding said olefinic mixture to nitric acid of a concentration from about 30% to about 75% while maintaining the temperature of the reaction mixture at not above about 90° C. and recovering the organic acid mixture so formed.

5. In a method for producing mixtures of organic acids containing dibasic acids from olefinic mixtures containing cyclic olefins and derived from petroleum fractions, the step comprising slowly adding said olefinic mixture to nitric acid of a concentration from about 30% to about 75% in the presence of an oxidation catalyst while maintaining the temperature of the reaction mixture at not above about 90° C. and recovering the organic acid mixture so formed.

6. In a method for producing a mixture of monobasic acids and dibasic acids from a petroleum hydrocarbon material comprising both acyclic and cyclic olefins, the step comprising oxidizing said acyclic and cyclic olefins by treatment of said material with nitric acid of a concentration from about 30% to about 75% while maintaining the temperature of the reaction mixture at not above about 90° C.

7. Process for oxidizing methyl-cyclopentene to produce methyl glutaric acid which comprises slowly adding said methyl-cyclopentene to nitric acid of a concentration of from about 30% to about 75% in the presence of an oxidation catalyst while maintaining the temperature of the reaction mixture at not above about 70° C. and recovering the methyl glutaric acid so formed.

CARL N. ZELLNER.